(12) United States Patent
Yang et al.

(10) Patent No.: US 12,348,030 B2
(45) Date of Patent: Jul. 1, 2025

(54) POWER DEMAND SIDE SPEECH INTERACTION METHOD AND SYSTEM

(71) Applicants: State Grid Lianyungang Power Supply Company, Jiangsu (CN); Lianyungang Zhiyuan Electric Power Design Co., Ltd., Jiangsu (CN)

(72) Inventors: Bin Yang, Jiangsu (CN); Bo Yang, Jiangsu (CN); Weitai Kong, Jiangsu (CN); Zhi Sun, Jiangsu (CN); Jianxin Wang, Jiangsu (CN); Wenjun Ruan, Jiangsu (CN); Yucheng Ren, Jiangsu (CN); Lu Qi, Jiangsu (CN); Hao Chen, Jiangsu (CN); Yueping Kong, Jiangsu (CN); Wei Yu, Jiangsu (CN); Hong Li, Jiangsu (CN); Guangxi Li, Jiangsu (CN); Hao Wu, Jiangsu (CN); Xue Sun, Jiangsu (CN); Xuewen Sun, Jiangsu (CN); Houkai Zhao, Jiangsu (CN); Houying Song, Jiangsu (CN); Hongxin Yin, Jiangsu (CN)

(73) Assignees: State Grid Lianyungang Power Supply Company, Lianyungang (CN); Lianyungang Zhiyuan Electric Power Design Co., Ltd., Lianyungang (CN)

( * ) Notice: Subject to any disclaimer, the term of this patent is extended or adjusted under 35 U.S.C. 154(b) by 0 days.

(21) Appl. No.: 17/777,050

(22) PCT Filed: Jan. 14, 2022

(86) PCT No.: PCT/CN2022/072147
§ 371 (c)(1),
(2) Date: May 16, 2022

(87) PCT Pub. No.: WO2023/082467
PCT Pub. Date: May 19, 2023

(65) Prior Publication Data
US 2024/0162743 A1 May 16, 2024

(30) Foreign Application Priority Data
Nov. 11, 2021 (CN) .......................... 202111337040.1

(51) Int. Cl.
*H02J 13/00* (2006.01)
*H02J 3/00* (2006.01)

(52) U.S. Cl.
CPC ........ *H02J 13/00001* (2020.01); *H02J 3/003* (2020.01); *H02J 2203/20* (2020.01)

(58) Field of Classification Search
None
See application file for complete search history.

(56) References Cited

U.S. PATENT DOCUMENTS

| 2013/0262107 A1* | 10/2013 | Bernard | G06F 16/40 704/235 |
| 2018/0261203 A1* | 9/2018 | Zoller | H04L 51/02 |
| 2020/0126103 A1* | 4/2020 | Rabison | H02J 3/12 |

FOREIGN PATENT DOCUMENTS

| CN | 107798032 A | 3/2018 |
| CN | 109147768 A | 1/2019 |
| CN | 112487046 A | 3/2021 |

* cited by examiner

Primary Examiner — Paul B Yanchus, III

(57) ABSTRACT

Disclosed are a power demand side speech interaction method and system. The method includes: obtaining original demand information, the original demand information including user's basic information, user demand information, and a user demand time; converting the original demand information into first information in text format; performing text statistical analysis based on an industry term on the first information in text format, to obtain second information; searching for corresponding user's actual information from a database according to the second information; outputting the user's actual information; searching for a corresponding forecasting model from the database, accord- (Continued)

ing to the second information and the user's basic information; calculating, according to a policy limit value of latest policy information in the database, a time for which the model corresponding to the user's basic information reaches the policy limit value; and transmitting an early warning message.

5 Claims, 2 Drawing Sheets

POWER DEMAND SIDE SPEECH INTERACTION METHOD AND SYSTEM

TECHNICAL FIELD

The present disclosure relates to the field of demand-side electric power interaction management technologies, and in particular, to a power demand side speech interaction method and system.

BACKGROUND

There exists a great amount of communication and contact requirements during an entire process of power demand side management, both in daily work of power demand side management (including but not limited to policy publicity, adjustable load resource investigation, demand response declaration, load control switch test tripping, enterprise information verification, plan notification confirmation, etc.), and emergency response scenarios of demand side management (early warning, supervision, etc., alerting customers in a shortest time and a largest range).

Conventional manners such as manual calling, short message notification or terminal short message notification have problems of low efficiency, difficulty in sharing information, insufficient comprehensive accuracy, difficulty in tracking service quality, difficulty in recording the process, or latent public opinion risk. Especially, when emergency work of power demand side management is initiated due to a force majeure event, tens of thousands of industrial enterprises need to be mobilized to take time off or reduce production. In the face of such urgent situation and the pressure of public opinion on power limits in other provinces across China, it is inefficient to notify each enterprise by manual calling, which usually takes a lot of manpower and time from governments at all levels and power supply companies to complete. In addition, according to preliminary calculation made by the National Development and Reform Commission, power supply shortages will become the norm this year and even during the 14th Five-Year Plan, which puts a huge pressure on the power demand side management.

Therefore, it is necessary to provide an interactive system on a power demand side, to ease burden of manual notification and communication in emergencies.

SUMMARY

The present disclosure provides a power demand side speech interaction method and system, which solves the problem in the related art that manually checking power supply conditions causes the need for users to queue up, making it difficult to allow users to know their electricity consumption conditions in a timely manner.

A basic solution of the present disclosure provides a power demand side speech interaction method, including:
  obtaining original demand information, the original demand information including user's basic information, user demand information, and a user demand time;
  converting the original demand information into first information in text format;
  performing text statistical analysis based on an industry term on the first information in text format, to obtain second information;
  searching for corresponding user's actual information from a database according to the second information, the database storing the user's basic information, user status information, the industry term, and policy information; and
  outputting the user's actual information.

Beneficial effects: in this solution, after a user inputs the original demand information, the original demand information is converted into a call text through speech-to-text conversion, which is convenient for subsequent archiving. In addition, an industry term included in the user's current demand information can be obtained by the text statistical analysis based on an industry term, so as to accurately analyze a specific power demand side item (equivalent to the second information) that the user wants to know. Then, the user's actual information corresponding to the demand side item is obtained by performing an automatic search over the database, and feedback is provided. In this method, different users have different original demand information, and the original demand information includes basic information representing a user's identity. That is to say, this method, when being executed, may obtain different original demand information of different users, so as to realize self-service query of demand side information, thereby reducing manual labor. In addition, this method may receive demands of multiple users and process these demands in parallel, which realizes self-service interactive query of multiple users, thereby avoiding queues.

Further, the obtaining original demand information includes:
  obtaining basic speech information transmitted by a user client in a communication connection; and
  splitting the basic speech information according to a preset rule to obtain speech segments, and correlating the speech segments from the same basic speech information, to obtain the original demand information.

Further, the preset rule includes:
  setting a first labeling signal for the basic speech information every preset duration, and if the first labeling signal is located at a keyword in the basic speech information, setting a second labeling signal in front of the keyword at the first labeling signal; and
  taking the first labeling signal and the second labeling signal as a boundary, a priority of the second labeling signal being higher than a priority of the first labeling signal, and splitting the basic speech information to obtain the speech segments including the keyword;
  where the keyword is preset.

Further, the converting the original demand information into first information in text format includes:
  performing speech-to-text conversion on each speech segment in the original information, to obtain a text segment; and grouping the text segments of the speech segments from the same original information as the first information.

Further, the performing text statistical analysis based on an industry term on the first information in text format, to obtain second information includes:
  using the industry term as a feature word, selecting text segments with the same feature word from all of the first information as the second information, and counting a number; and
  determining, according to the number corresponding to each feature word, a priority corresponding to the feature word;
  the priority being configured for an execution order of searching for corresponding user's actual information according to each piece of second information from the database.

Further, the performing text statistical analysis based on an industry term on the first information in text format, to obtain second information includes:

selecting a text including a feature word from the first information as the second information, the feature word being the industry term.

Further, the searching for corresponding user's actual information from a database according to the second information includes:

searching for user's latest actual electricity consumption information from the database according to the second information, the user's actual information including user's actual electricity consumption information, and the database being automatically updated after acquiring the user's actual electricity consumption information associated with the user's basic information.

Further, the method also includes:

searching for a corresponding forecasting model from the database, according to the second information and the user's basic information;

calculating, according to a policy limit value of latest policy information in the database, a policy limit time for which the model corresponding to the user's basic information reaches the policy limit value; and transmitting an early warning message based on the user's basic information and according to the policy limit time;

the database stores a historical dataset, the historical dataset includes the user's basic information, electricity consumption items, user status information, the industry term, and policy information; the forecasting model associated with the user's basic information and a preset item is calculated, according to the historical dataset and in combination with a neural network model; and the latest policy information is policy information of a region found by a location in the user's basic information.

Further, the transmitting an early warning message based on the user's basic information and according to the policy limit time includes:

transmitting the early warning message to a user client corresponding to the user's basic information, in a case that the policy limit time is less than or equal to a preset value.

Further, the transmitting an early warning message based on the user's basic information and according to the policy limit time includes:

transmitting the early warning message a preset number of times to a user client of the policy time limit at a preset period, in a case that the user's basic information and a feedback signal transmitted by the user client have not been received within a preset duration.

The present disclosure further provides a power demand side speech interaction system, including:

an acquisition module, configured to acquire original demand information;

a speech-to-text conversion module, configured to convert the original demand information transmitted by the acquisition module into first information in text format;

a text statistics module, configured to perform text statistical analysis based on an industry term on the first information in text format transmitted by the speech-to-text conversion module, to obtain second information;

a processing module, configured to search for corresponding user's actual information from a database according to the second information, the database storing the user's basic information, user status information, the industry term, and policy information; and an output module, configured to output the user's actual information.

DETAILED DESCRIPTION

In order to make the objectives, technical solutions and advantages of the embodiments of the present disclosure clearer, the implementations of the present application are described in detail below with reference to the drawings. Those of ordinary skill in the art should understand that many technical details are proposed in the embodiments of the present disclosure to make the present disclosure better understood. However, even without these technical details and various changes and modifications made based on the following embodiments, the technical solutions claimed in the present disclosure may still be realized.

First Embodiment

The first embodiment of the present disclosure provides a power demand side speech interaction method, including: obtaining original demand information, the original demand information including user's basic information, user demand information, and a user demand time; converting the original demand information into first information in text format; performing text statistical analysis based on an industry term on the first information in text format, to obtain second information; searching for corresponding user's actual information from a database according to the second information, the database storing the user's basic information, user status information, the industry term, and policy information; and outputting the user's actual information.

After a user inputs the original demand information, the original demand information is converted into a call text through speech-to-text conversion, which is convenient for subsequent archiving. In addition, an industry term included in the user's current demand information can be obtained by the text statistical analysis based on an industry term, so as to accurately analyze a specific power demand side item (equivalent to the second information) that the user wants to know. Then, the user's actual information corresponding to the demand side item is obtained by performing an automatic search over the database, and feedback is provided. In this method, different users have different original demand information, and the original demand information includes basic information representing a user's identity. That is to say, this method, when being executed, may obtain different original demand information of different users, so as to realize self-service query of demand side information, thereby reducing manual labor. In addition, this method may receive demands of multiple users and process these demands in parallel, which realizes self-service interactive query of multiple users, thereby avoiding queues.

Figure 1:
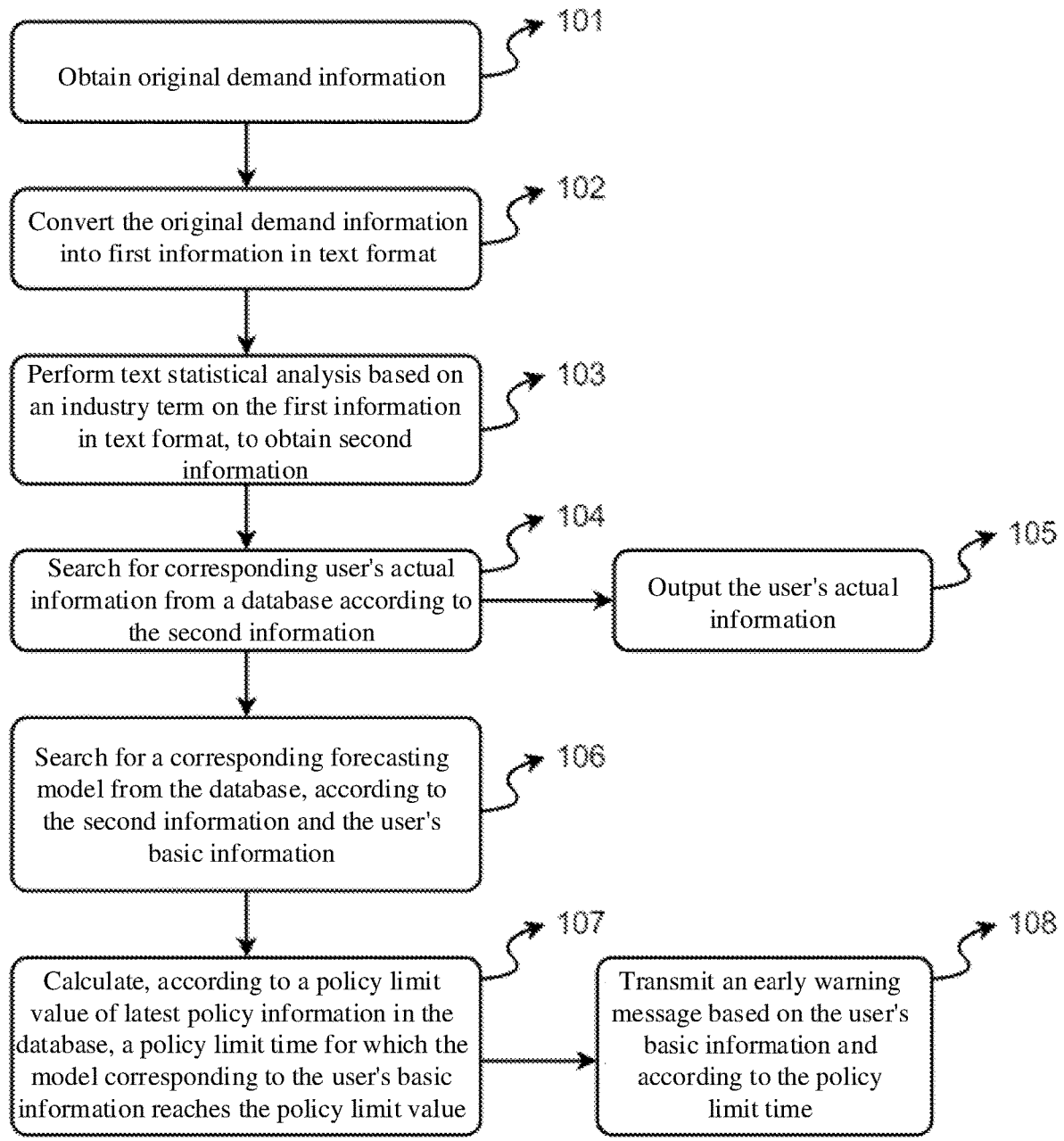
FIG. 1 is a schematic flowchart of a power demand side speech interaction method according to the present disclosure.

In the following, implementation details of a power demand side speech interaction method according to an embodiment are described. The following is merely provided for easy understanding, and is not necessary for implementing this solution. A specific flow of this embodiment is as shown in FIG. 1. This embodiment is applied to a power demand side speech interaction system.

Step 101. Obtain original demand information. The original demand information includes user's basic information, user demand information, and a user demand time.

Specifically, there are various ways to obtain the original demand information. A first way is to scan a table, to obtain an image of the scanned table; then, an item corresponding to each vacancy in the table is recognized by an existing image recognition technology, and all the items to be filled are used as the original demand information. A second way is to use speech acquisition. An object of the speech acquisition is speech information transmitted by a user client that has established a communication connection with the system. At the moment when the system establishes the communication connection with the user client, a recording function is activated, to record the speech information transmitted by the user client, and transmit the speech information to the database for archiving. This is convenient for a staff member to manually search according to the user's basic information, a user communication time, a user communication duration, or a user communication keyword. The archived speech information can be used as basis for subsequent information verification.

In some embodiments, obtaining the original demand information includes: obtaining basic speech information transmitted by the user client in a communication connection; splitting the basic speech information according to a preset rule to obtain speech segments, and correlating the speech segments from the same basic speech information to obtain the original demand information.

The preset rule is to set a first labeling signal for the basic speech information every preset duration. If the first labeling signal is located at a keyword in the basic speech information, a second labeling signal is set in front of the keyword at the first labeling signal. With the first labeling signal and the second labeling signal as a boundary, a priority of the second labeling signal being higher than a priority of the first labeling signal, and the basic speech information is split, to obtain the speech segments including the keyword. The keyword is preset.

The solution in this embodiment takes into account that the amount of the basic speech information is massive in a case that the communication between the user client and the system lasts too long. In order to make the system to run faster, the basic speech information is split into a plurality of associated speech segments, which is convenient for simultaneous processing of each speech segment. The specification of the preset rule avoids a situation in which an original keyword is damaged when splitting the basic speech information, which ensures integrity of each speech segment after the segmentation. The keyword is preset, which is typically set to a pronunciation of a modal particle as an initial sound, such as "today", "however", "first", "in short", etc. In some embodiments, the keyword may be directly set as the industry term.

Further, a process of establishing the communication connection between the system and the user client includes: obtaining the original demand information transmitted by the user client; identifying the user's basic information in the original demand information, and comparing the user's basic information with all pieces of user's basic information authorized by the system for communication connection; and if a user name and a password in any piece of user's basic information are consistent, it is determined that the communication connection between the system and the user client is normal, and step S101 is performed.

Step 102. Convert the original demand information into first information in text format.

Specifically, speech-to-text conversion is performed on each speech segment in the original information, to obtain a text segment; and the text segments converted from the speech segments in the same original information are grouped together as the first information.

Step 103. Perform text statistical analysis based on an industry term on the first information in text format, to obtain second information.

Specifically, the industry term is used as a feature word, and text segments having the same feature word are selected from all the first information as the second information. The text segments having the same feature word are selected from all the first information as the second information, and the feature word in all the text segments having the same feature word is extracted as the second information, to be used for a subsequent query processing. This solution selects the feature word in the first information as the second information, which reduces an information processing amount. Generally, the feature word is set as an electric power query item.

In some embodiments, the industry term is used as the feature word, the text segments having the same feature word are selected from all the first information as the second information, and a number is counted. According to the number corresponding to each feature word, a priority corresponding to the feature word is determined. The priority is used for an execution order of searching for corresponding user's actual information according to each piece of second information from the database. Further, a text having the feature word is selected from the first information as the second information, and the feature word is the industry term.

In other embodiments, the text statistical analysis based on an industry term performed on the first information in text format may use a semantic analysis model. A specific process is: substituting the first information in text format and a preset industry term into the semantic analysis model, to obtain the second information. For example, "Don't want to know the voltage of this month". In accordance with the previous embodiment, the second information outputted includes "voltage of this month". In contrast, in accordance with the instant embodiment, "voltage of this month" is not outputted. The establishment of the semantic analysis model depends on a semantic analysis library, which is suitable for semantic analysis of common sentence patterns, such as an antisense sentence, an inverted sentence, an interrogative sentence, a rhetorical question, etc. This is advantageous to determining the semantics of the first information, to avoid using an irrelevant feature word as the second information, thereby improving an accuracy of the system.

Step 104. Search for corresponding user's actual information from a database according to the second information. The database stores the user's basic information, user status information, the industry term, and policy information.

Specifically, user's latest actual electricity consumption information is found from the database according to the second information. The user's actual information includes user's actual electricity consumption information. The database is automatically updated after acquiring the user's actual electricity consumption information associated with the user's basic information. The actual electricity consumption information in the database is updated at any time, with an update rate being synchronous with the acquired actual electricity consumption information.

Step 105. Output the user's actual information.

Specifically, the user's actual information is transmitted to the user client corresponding to the user's basic information in the original demand information in step 101 via a short message service platform, so as to allow a user to know information in time.

In some embodiments, the user's actual information is outputted by means of voice broadcasting. First, the user's actual information in text format is converted into a voice entry by a text-to-speech technology, then a simplest sentence pattern closest to the voice entry is found by the foregoing semantic analysis model, and finally the simplest sentence pattern is broadcasted to the user client in the communication connection.

Further, this solution also provides a forecasting service, specifically including:

Step 106, Search for a corresponding forecasting model from the database according to the second information and the user's basic information.

Specifically, the database stores a historical dataset and the forecasting model. The historical dataset includes the user's basic information, electricity consumption items, user status information, the industry term, and policy information. A preset model is set as follows: a forecasting model associated with the user's basic information and a preset item is calculated according to the historical dataset and in combination with a neural network model, and the forecasting model is stored in the database. Step 106 aims to search for the corresponding forecasting model according to the second information (electric power item) and the user's basic information. The found model represents a change trend of electric power data of the user as the second information changes. The change trend of the electric power data may be used to forecast a specific item (second information) of a specific user, so as to avoid touching the bottom line of policies.

In some embodiments, the user's basic information and the second information in this step are those in step 105.

In other embodiments, the user's basic information and the second information in this step are obtained through permutation and combination according to all the authorized user's basic information and all the feature words (equivalent to electric power items) in the database.

Step 107. Calculate, according to a policy limit value of latest policy information in the database, a policy limit time for which the forecasting model corresponding to the user's basic information reaches the policy limit value.

Specifically, the latest policy information is policy information of a region found by a location in the user's basic information. The user's basic information includes a user name, a user age, a user identity number, a user password, and location information. Since power rationing policies in different positions are different, in this embodiment, the corresponding policy information is obtained according to the user's position, and then a policy limit range (constituted by a plurality of policy limit values) of the policy on the power supply is analyzed by the semantic analysis model. A remaining time to reach the policy limit value may be estimated according to the foregoing forecasting model and the policy limit value. The remaining time is "the policy limit time to reach the policy limit value".

Step 108. Transmit an early warning message based on the user's basic information and according to the policy limit time.

Specifically, the policy limit value is a maximum value of electricity that can be supplied, and step 108 specifically includes: transmitting the early warning message to the user client corresponding to the user's basic information, in a case that the policy limit time is less than or equal to a preset value.

Further, in order to confirm that the user has received the early warning message, this step further includes: transmitting the early warning message a preset number of times to the user client of the policy time limit at a preset period, in a case that the user's basic information and a feedback signal transmitted by the user client have not been received within a preset duration. The preset duration, the preset period and the preset number of times are all set by a staff member. The early warning can only be terminated after confirmation by the user, otherwise the early warning message will be transmitted again at the preset period and the preset number of times.

In some embodiments, setting the early warning message includes: S8-1. formulating an information template according to different requirements, such as a public service and a marketization service; S8-2. customizing a publicity region according to a power supply region or an administrative region; S8-3. selecting a customer group in the customized publicity region; and S8-4. publishing information via speech, short message, or speech plus short message, recording a reminder result and evaluating an effect through statistical analysis. The user's basic information that fails to satisfy the policy limit value is transmitted to all users in a smallest administrative region, to avoid users from blackmail. For example, in business scenarios such as work supervision, a function of making teleconferences or telephonic broadcasting with users, and a capability of making teleconferences and telephonic broadcasting with up to 200 people. This enables users to know their own electricity consumption conditions through self-service interaction, and allows to forecast emergency situations, so as to provide early warning in batches.

The divisions of the various steps above are intended for clear description. In implementation, all these steps may be merged into one step or some of them may be split into multiple steps, but the merged and split steps with the same logical relationship as the original steps should fall within the protection scope of the present disclosure. Insignificant modifications made and designs introduced to the process flow without changing the core design of the process flow should also fall within the protection scope of the present disclosure.

Second Embodiment

Figure 2:
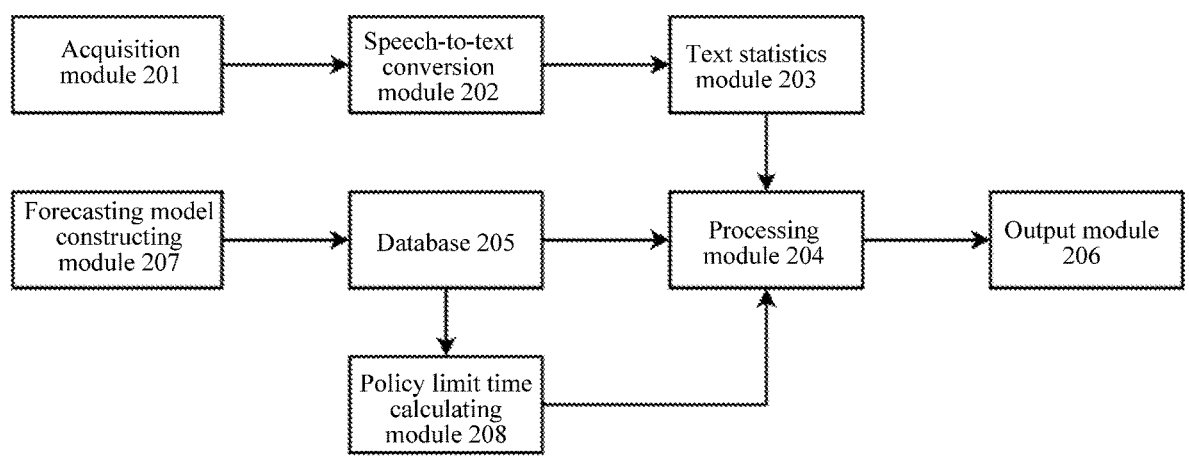
FIG. 2 is a schematic structural diagram of a power demand side speech interaction system according to the present disclosure.

The second embodiment of the present disclosure further provides a power demand side speech interaction system, as shown in FIG. 2, including:

An acquisition module 201 is configured to acquire original demand information.

A speech-to-text conversion module 202 is configured to convert the original demand information transmitted by the acquisition module 201 into first information in text format.

A text statistics module 203 is configured to perform text statistical analysis based on an industry term on the first information in text format transmitted by the speech-to-text conversion module 202, to obtain second information.

A processing module 204 is configured to search for corresponding user's actual information from a database 205 according to the second information in the text statistics module 203.

The database 205 is configured to store a historical dataset and a forecasting model. The historical dataset includes the user's basic information, electricity consumption items, user status information, the industry term, and policy information.

An output module 206 is configured to output the user's actual information.

Further, a forecasting model constructing module 207 is configured to calculate the forecasting model associated with the user's basic information and a preset item, according to the historical dataset and in combination with a neural network model, and transmit the forecasting model to the database 205 for storage.

A policy limit time calculating module 208 is configured to calculate, according to a policy limit value of latest policy information in the database 205, a policy limit time for which the forecasting model corresponding to the user's basic information reaches the policy limit value.

The processing module 204 is configured to transmit an early warning signal to an early warning module based on the user's basic information and according to the policy limit time.

The output module 206 is configured to transmit an early warning message.

In another embodiment, the power demand side speech interaction system includes: a processor, configured to perform the foregoing program modules stored in a memory, including: the acquisition module 201, the speech-to-text conversion module 202, the text statistics module 203, the processing module 204, the database 205, the output module 206, the forecasting model constructing module 207, and the policy limit time calculating module 208.

Each module involved in this embodiment is a logical module. During actual application, a logical unit may be a physical unit, or may be a part of a physical unit, or may be implemented as a combination of a plurality of physical units. In addition, in order to highlight the innovative part of the present disclosure, units that are not closely related to resolving the technical problem proposed by the present disclosure are not introduced in this embodiment, but this does not indicate that there are no other units in this embodiment.

This embodiment is a system embodiment corresponding to the first embodiment, and this embodiment may be implemented in cooperation with the first embodiment. The relevant technical details mentioned in the first embodiment are still effective in this embodiment, which is not detailed herein to avoid redundancy. Correspondingly, the related technical details mentioned in this embodiment can also be applied to the first embodiment.

The above are merely the embodiments of the present disclosure. Common knowledge such as well-known specific structures and characteristics in the solution are not detailed herein. Those skilled in the art know all the common technical knowledge in the technical field to which the present disclosure belongs before the filing date or the priority date, and have the ability to apply conventional experimental means before the date. Those skilled in the art can improve and implement this solution in combination with their own abilities under the inspiration given in present disclosure. Some typical well-known structures or well-known methods should not be an obstacle for those skilled in the art to practice the present disclosure. It should be noted that those skilled in the art may further make several variations and improvements without departing from the scope of the present disclosure, but such variations and improvements should also be deemed as falling within the protection scope of the present disclosure without affecting the implementation effect and practicability of the patent. The protection scope claimed in this application shall be based on contents of claims, and disclosure in the specification such as the detailed description may be used to interpret the contents of the claims.

The invention claimed is:

1. A power demand side speech interaction method, comprising:
    obtaining original demand information by a processor, the original demand information comprising user's basic information, user demand information, and a user demand time;
    converting the original demand information into first information in text format by the processor;
    performing text statistical analysis based on an industry term on the first information in text format by the processor, to obtain second information;
    searching for corresponding user's actual information from a database according to the second information by the processor, the database storing the user's basic information, user status information, the industry term, and policy information; and
    outputting the user's actual information by the processor;
    wherein the method further comprising:
    searching for a corresponding forecasting model from the database, according to the second information and the user's basic information by the processor, the corresponding forecasting model represents a change trend of electric power data of the user as the second information changes;
    calculating, according to a policy limit value of latest policy information in the database, a policy limit time for which the forecasting model corresponding to the user's basic information reaches the policy limit value by the processor; and
    transmitting an early warning message based on the user's basic information and the policy limit time by the processor; wherein industrial enterprises mobilizes to take time off or reduce production based on the early warning message;
    wherein the database stores a historical dataset, the historical dataset comprises the user's basic information, electricity consumption items, user status information, the industry term, and policy information; the forecasting model associated with the user's basic information and a preset item is calculated, according to the historical dataset and in combination with a neural network model; and the latest policy information is policy information of a region found by a location in the user's basic information;
    wherein the obtaining original demand information comprises:
    obtaining basic speech information transmitted by a user client in a communication connection; and
    splitting the basic speech information according to a preset rule to obtain speech segments, and correlating the speech segments from the same basic speech information, to obtain the original demand information;
    wherein the preset rule comprises:
    setting a first labeling signal for the basic speech information every preset duration, and in a case that the first labeling signal is located at a keyword in the basic speech information, setting a second labeling signal in front of the keyword at the first labeling signal; and
    taking the first labeling signal and the second labeling signal as a boundary, a priority of the second labeling signal being higher than a priority of the first labeling signal, and splitting the basic speech information to obtain the speech segments comprising the keyword;

wherein the keyword is preset;

wherein the converting the original demand information into first information in text format comprises:

performing speech-to-text conversion on each speech segment in the original demand information, to obtain a text segment; and grouping the text segments of the speech segments from the same original demand information as the first information;

wherein the performing text statistical analysis based on an industry term on the first information in text format, to obtain second information comprises:

using the industry term as a feature word, selecting text segments with the same feature word from all of the first information as the second information, and counting a number; and determining, according to the number corresponding to each feature word, a priority corresponding to the feature word;

the priority being configured for an execution order of searching for corresponding user's actual information according to each piece of second information from the database.

2. The power demand side speech interaction method according to claim 1, wherein the searching for corresponding user's actual information from a database according to the second information comprises:

searching for user's latest actual electricity consumption information from the database according to the second information, the user's actual information comprising user's actual electricity consumption information, and the database being automatically updated after acquiring the user's actual electricity consumption information associated with the user's basic information.

3. The power demand side speech interaction method according to claim 1, wherein the transmitting an early warning message based on the user's basic information and according to the policy limit time comprises:

transmitting the early warning message to a user client corresponding to the user's basic information, in a case that the policy limit time is less than or equal to a preset value.

4. The power demand side speech interaction method according to claim 1, wherein the transmitting an early warning message based on the user's basic information and according to the policy limit time comprises:

transmitting the early warning message a preset number of times to a user client of the policy time limit at a preset period, in a case that the user's basic information and a feedback signal transmitted by the user client have not been received within a preset duration.

5. A power demand side speech interaction system, comprising a memory and a processor configured to execute programming modules stored in the memory, wherein the programming modules comprise:

an acquisition module, configured to acquire original demand information;

a speech-to-text conversion module, configured to convert the original demand information transmitted by the acquisition module into first information in text format;

a text statistics module, configured to perform text statistical analysis based on an industry term on the first information in text format transmitted by the speech-to-text conversion module, to obtain second information;

a processing module, configured to search for corresponding user's actual information from a database according to the second information, the database storing the user's basic information, user status information, the industry term, and policy information; and an output module, configured to output the user's actual information;

wherein the processor is further configured to:

search for a corresponding forecasting model from the database, according to the second information and the user's basic information, the corresponding forecasting model represents a change trend of electric power data of the user as the second information changes;

calculate, according to a policy limit value of latest policy information in the database, a policy limit time for which the forecasting model corresponding to the user's basic information reaches the policy limit value; and transmit an early warning message based on the user's basic information and the policy limit time; wherein industrial enterprises mobilizes to take time off or reduce production based on the early warning message;

wherein the database stores a historical dataset, the historical dataset comprises the user's basic information, electricity consumption items, user status information, the industry term, and policy information; the forecasting model associated with the user's basic information and a preset item is calculated, according to the historical dataset and in combination with a neural network model; and the latest policy information is policy information of a region found by a location in the user's basic information;

wherein the acquisition module is specifically configured to:

obtain basic speech information transmitted by a user client in a communication connection; and split the basic speech information according to a preset rule to obtain speech segments, and correlating the speech segments from the same basic speech information, to obtain the original demand information;

wherein the preset rule comprises:

setting a first labeling signal for the basic speech information every preset duration, and in a case that the first labeling signal is located at a keyword in the basic speech information, setting a second labeling signal in front of the keyword at the first labeling signal; and taking the first labeling signal and the second labeling signal as a boundary, a priority of the second labeling signal being higher than a priority of the first labeling signal, and splitting the basic speech information to obtain the speech segments comprising the keyword;

wherein the keyword is preset;

wherein the speech-to-text conversion module is specifically configured to:

perform speech-to-text conversion on each speech segment in the original demand information, to obtain a text segment; and group the text segments of the speech segments from the same original demand information as the first information;

wherein the text statistics module is specifically configured to:

using the industry term as a feature word, selecting text segments with the same feature word from all of the first information as the second information, and counting a number; and determining, according to the number corresponding to each feature word, a priority corresponding to the feature word;
the priority being configured for an execution order of searching for corresponding user's actual information according to each piece of second information from the database.

\* \* \* \* \*